(12) United States Patent
Morris et al.

(10) Patent No.: US 12,121,170 B2
(45) Date of Patent: Oct. 22, 2024

(54) DEVICES AND METHODS FOR ORGANIZING HATS

(71) Applicant: Wilris LLC, Arvada, CO (US)

(72) Inventors: Chase William Morris, Arvada, CO (US); Ryne Wilson, Northglenn, CO (US)

(73) Assignee: Wilris, LLC, Arvada, CO (US)

( * ) Notice: Subject to any disclaimer, the term of this patent is extended or adjusted under 35 U.S.C. 154(b) by 0 days.

(21) Appl. No.: 17/909,320

(22) PCT Filed: Mar. 2, 2021

(86) PCT No.: PCT/US2021/020543
§ 371 (c)(1),
(2) Date: Sep. 2, 2022

(87) PCT Pub. No.: WO2021/178451
PCT Pub. Date: Sep. 10, 2021

(65) Prior Publication Data
US 2023/0090026 A1    Mar. 23, 2023

Related U.S. Application Data

(60) Provisional application No. 62/984,052, filed on Mar. 2, 2020.

(51) Int. Cl.
*A47G 25/10* (2006.01)
*F16B 1/00* (2006.01)

(52) U.S. Cl.
CPC ............... *A47G 25/10* (2013.01); *F16B 1/00* (2013.01); *A47G 2200/106* (2013.01); *F16B 2200/83* (2023.08)

(58) Field of Classification Search
CPC ..... A47G 25/10; A47G 2200/106; F16B 1/00; F16B 2200/83; A47F 7/06
See application file for complete search history.

(56) References Cited

U.S. PATENT DOCUMENTS

| | | | | | |
|---|---|---|---|---|---|
| 97,524 | A | * | 12/1869 | Krebs | B62K 25/02 |
| | | | | | 297/440.2 |
| 275,581 | A | * | 4/1883 | Bundy | A47G 25/10 |
| | | | | | 248/305 |
| 323,773 | A | * | 8/1885 | Badger | A47G 25/10 |
| | | | | | 211/32 |

(Continued)

FOREIGN PATENT DOCUMENTS

WO    2021178451 A1    9/2021

*Primary Examiner* — Ko H Chan

(57) ABSTRACT

A hat holder for effectively holding a hat in a manner and position simulating the position that the hat would take when placed on a person's head, effectively displaying the front portion of the hat and maintaining the shape of the hat without leaving any marks on the hat. The device includes a magnet that creates a magnetic bond with the ferrous part of the hat, a general hat form being additional support for maintaining the general shape of a hat, an arm that connects from the support structure to the base and a base which allows the hat to be supported from various support structures including but not limited to a vertical wall surface or the like with the orientation enabling the hat to be positioned generally in the attitude that the hat would assume when placed on a person's head.

18 Claims, 7 Drawing Sheets

FIG. 1

(56) References Cited

U.S. PATENT DOCUMENTS

| | | | | |
|---|---|---|---|---|
| 350,807 A * | 10/1886 | Clark | ............... | A47G 25/10 211/32 |
| 394,792 A * | 12/1888 | Shoe | ............... | A47G 25/10 248/304 |
| 411,387 A * | 9/1889 | Manning | ............... | A47G 25/10 211/32 |
| 421,879 A * | 2/1890 | Wilson | ............... | A47F 7/06 223/66 |
| 451,568 A * | 5/1891 | Murrin | ............... | A47G 25/10 248/304 |
| 503,949 A * | 8/1893 | Crouch | ............... | A47G 25/10 211/32 |
| 532,109 A * | 1/1895 | Stinchcomb et al. | . | A47G 25/10 248/303 |
| 621,023 A * | 3/1899 | Boas | ............... | A47F 7/06 211/32 |
| 1,403,004 A | 1/1922 | Beckers | | |
| 1,450,535 A * | 4/1923 | Yoder | ............... | A47G 25/10 211/31 |
| D161,680 S | 1/1951 | Cook | | |
| 3,208,597 A * | 9/1965 | Hansen | ............... | A47G 25/10 211/32 |
| D269,486 S | 6/1983 | Marrs | | |
| 5,188,325 A | 2/1993 | Hilty et al. | | |
| 5,630,516 A | 5/1997 | Helman | | |
| 5,772,049 A * | 6/1998 | Randone | ............... | A47F 7/06 211/32 |
| 6,079,679 A | 6/2000 | Mitchell | | |
| D465,724 S | 11/2002 | Goodman et al. | | |
| 6,672,551 B2 | 1/2004 | Rivellino et al. | | |
| D647,710 S | 11/2011 | Anderson | | |
| D666,478 S | 9/2012 | Chou | | |
| D715,627 S | 10/2014 | Pan et al. | | |
| 9,182,074 B2 | 11/2015 | Duenas | | |
| D858,116 S | 9/2019 | Wierbicki | | |
| 2013/0292523 A1 | 11/2013 | Moore et al. | | |
| 2013/0313387 A1 | 11/2013 | Ly | | |
| 2015/0298617 A1* | 10/2015 | Welch | ............... | B60R 7/10 224/275 |

* cited by examiner

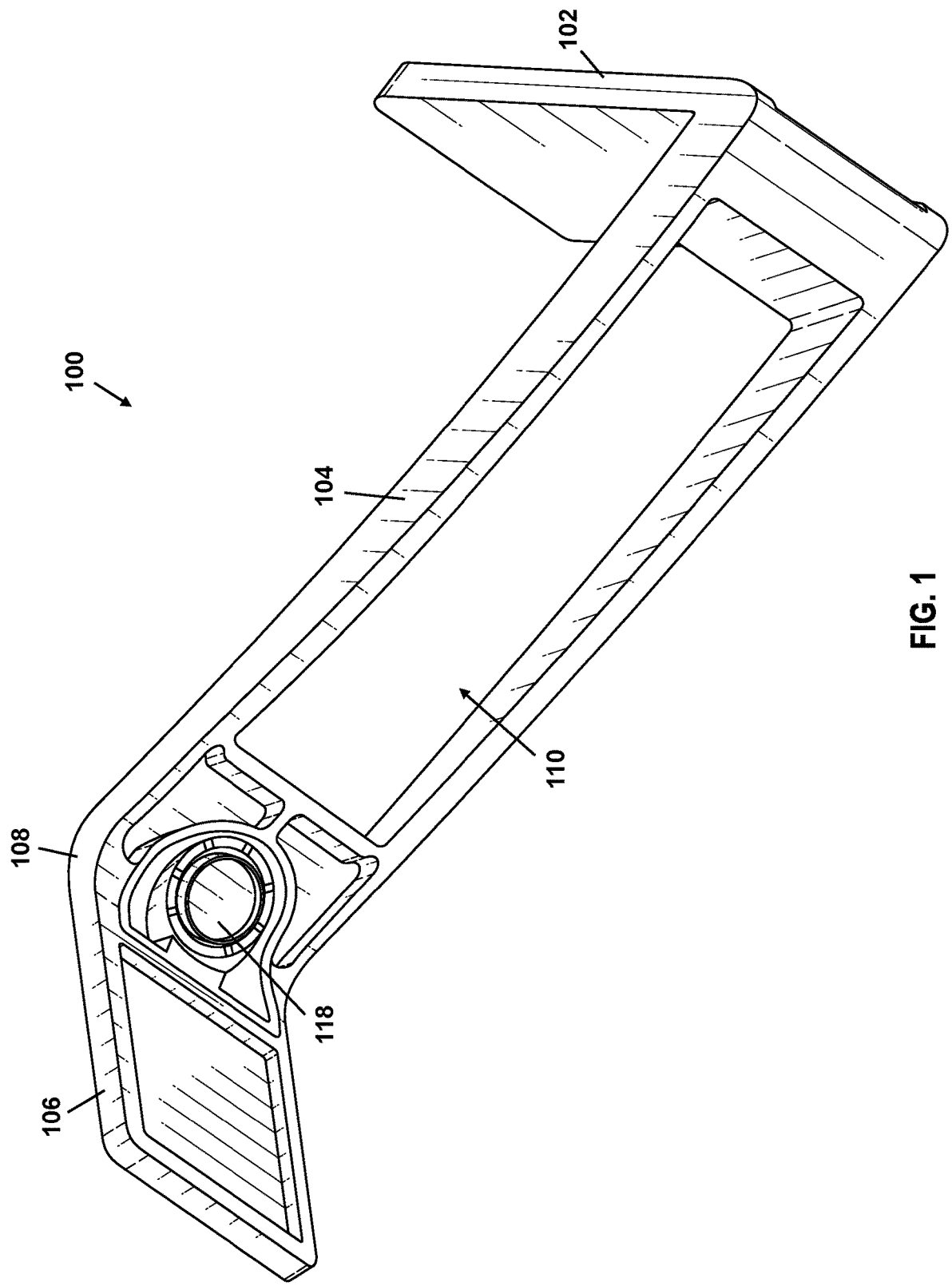

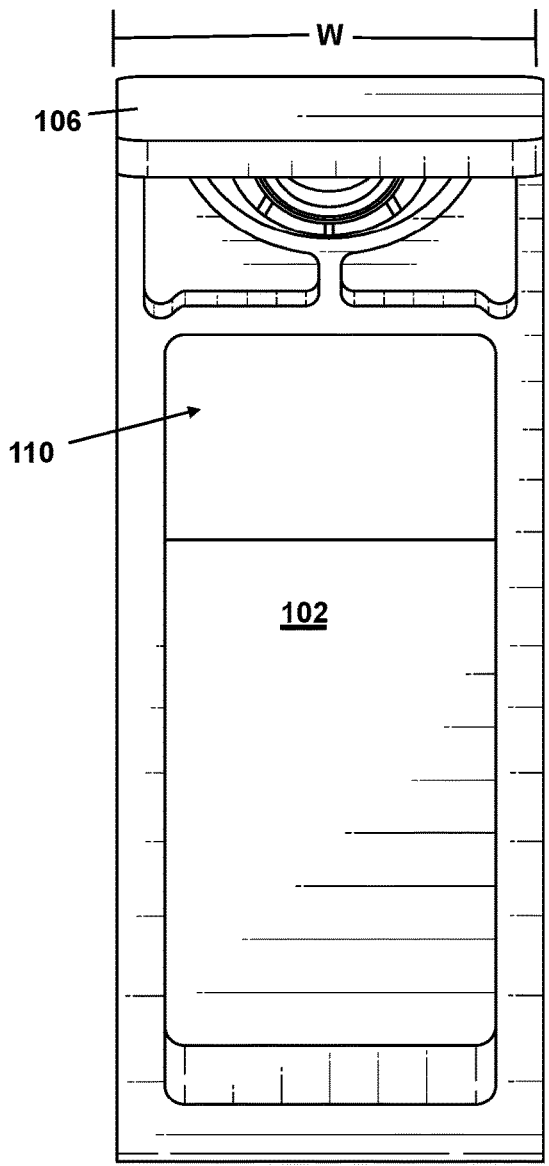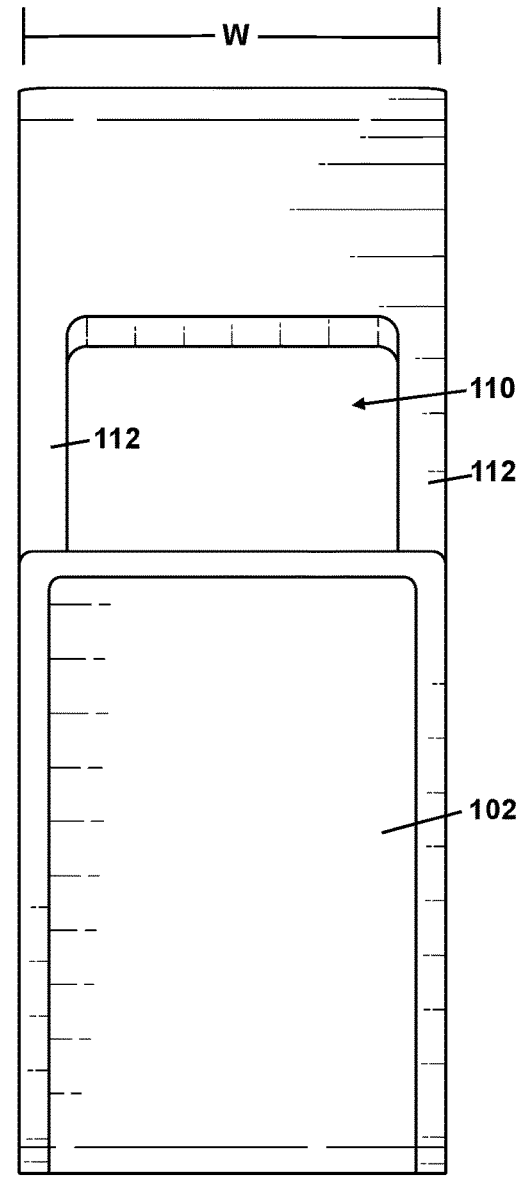
FIG. 2  FIG. 3

DEVICES AND METHODS FOR ORGANIZING HATS

CROSS-REFERENCE TO RELATED APPLICATIONS

This application is a 371 national stage application of international application No. PCT/US2021/020543, filed Mar. 2, 2021, which claims the benefit of and priority to U.S. Provisional Patent Application No. 62/984,052, filed Mar. 2, 2020, each of which is hereby incorporated by reference in its entirety.

BACKGROUND

The majority of existing hat holders rely on some combination of gravity, friction and clamping forces to hold a hat in place. These hat holders position the hat such that the front of the hat, typically showing a logo, is not visible. For example, U.S. Pat. No. 9,182,074 discloses a hat holder configured to hang a hat in a downward orientation. While such a system may adequately hold a hat, it does not satisfy a hat retailer or hat owner who wishes to display the logos, messages and/or designs on the faces of their hats.

SUMMARY

The devices and methods disclosed herein solve the problem of obscuring a stored hat's message or design by providing a hat holder configured to allow a hat, such as a baseball cap, to be held in an as-worn orientation (e.g., with an axis oriented along a crest of the brim substantially parallel with a plane of the ground). In an embodiment, a magnet within the hat holder attracts magnetic material within a button located on the top of a ballcap to keep the weight of the hat brim from pulling the hat into a downward orientation.

In an aspect, a hat holder comprises a base configured for attachment to a mounting surface, an arm connected to the base and extending away from the mounting surface, the arm joining a brim-support to form a crest, and a magnet intersected by a plane through and parallel with the crest. In an embodiment, the magnet is bisected by the plane through the crest.

In an embodiment, widths of the base, the arm and/or the brim-support are the same.

In an embodiment, the arm forms an acute angle with a body of the base.

In an embodiment, a magnet of the hat holder is disposed in an underside of the hat holder or in a topside of the hat holder. In an embodiment, a magnet is fully encased within the hat holder.

In an embodiment, the arm of the hat holder is connected to an end of the base. In an embodiment, the arm of the hat holder is connected to an end of the brim-support. In an embodiment, the arm of the hat holder is connected to both the end of the base and the end of the brim-support.

In an embodiment, a bottom surface of the base is configured to mate with a wall cleat. In an embodiment, the bottom surface of the base slidably mates with the wall cleat.

In an embodiment, the arm of the hat holder comprises a slot. In an embodiment, the brim-support of the hat holder comprises an opening.

In an embodiment, a mounting surface that the hat holder is intended to be affixed to is a vertically oriented mounting surface.

In an aspect, a hat hold comprises a base configured for attachment to a mounting surface and an arm connected to the base and extending away from the mounting surface, wherein the arm joins a brim-support to form a crest and wherein widths of the base, the arm, and the brim-support are the same. In an embodiment, the hat holder further comprises a magnet intersected by a plane through and parallel with the crest. In an embodiment, the magnet is bisected by the plane through the crest.

In an aspect, a method of displaying a hat comprises mounting a hat holder as disclosed herein to a vertically oriented mounting surface and placing a hat over the brim-support. In an embodiment, placing the hat over the brim-support comprises placing the hat such that a magnetic material of the hat is attracted to the magnet within the hat holder.

In an embodiment, the hat holder displays a hat generally in the attitude the hat would assume when worn by a person. In an embodiment, the hat holder displays the front of the hat. In an embodiment, the hat holder is not visible when a hat is on the holder and it is viewed from the front at eye level.

In an embodiment, a wall cleat comprises an adhesive for joining the wall cleat with a mounting surface.

BRIEF DESCRIPTION OF THE DRAWINGS

Illustrative embodiments of the present invention are described in detail below with reference to the attached drawings.

FIG. 1 is a perspective view of a hat holder, according to an embodiment.

FIG. 2 is a front plan view of the hat holder of FIG. 1.

FIG. 3 is a back plan view of a hat holder of FIGS. 1-2.

DETAILED DESCRIPTION

Figure 4:
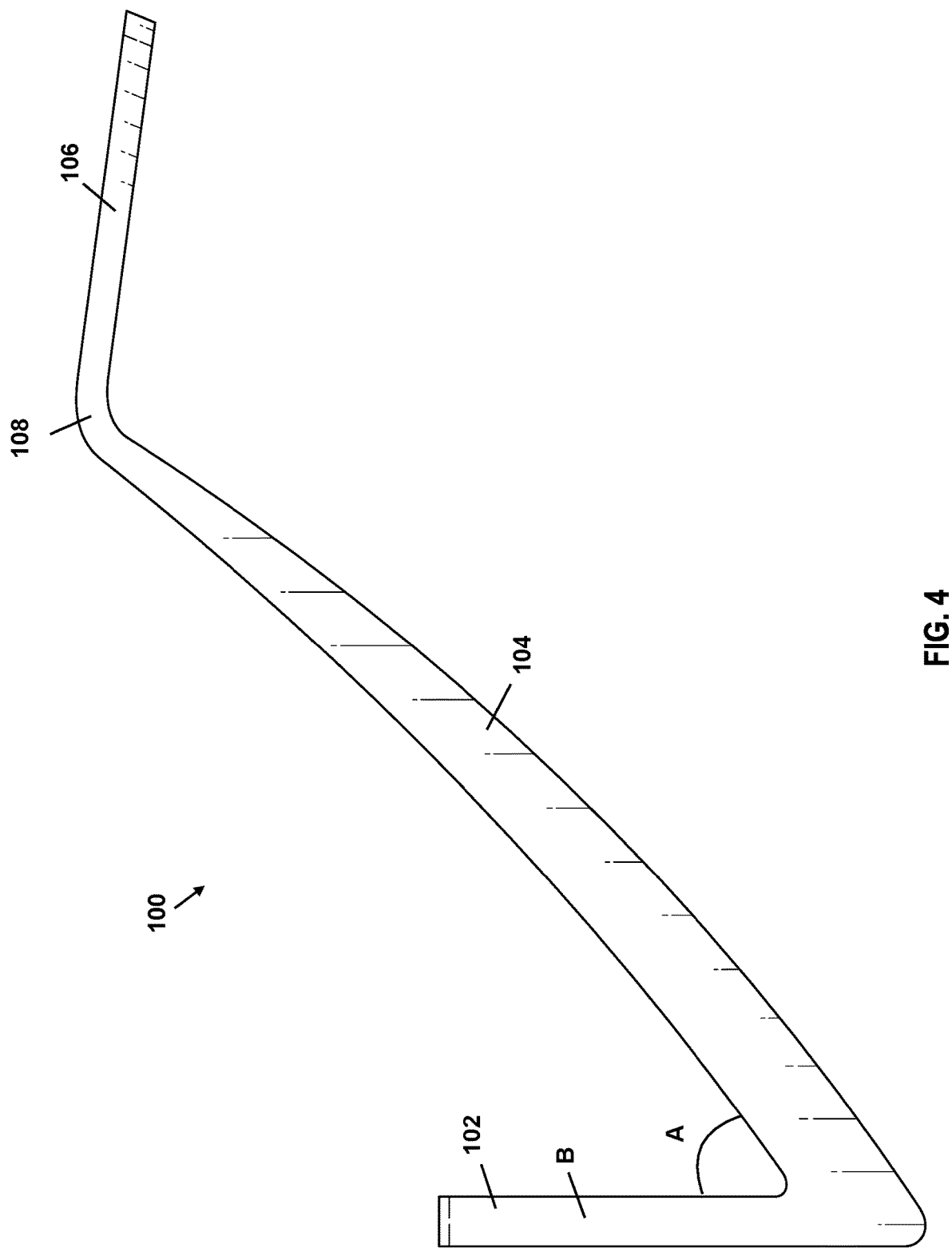
FIG. 4 is a left side plan view of a hat holder of FIGS. 1-3.
Figure 5:
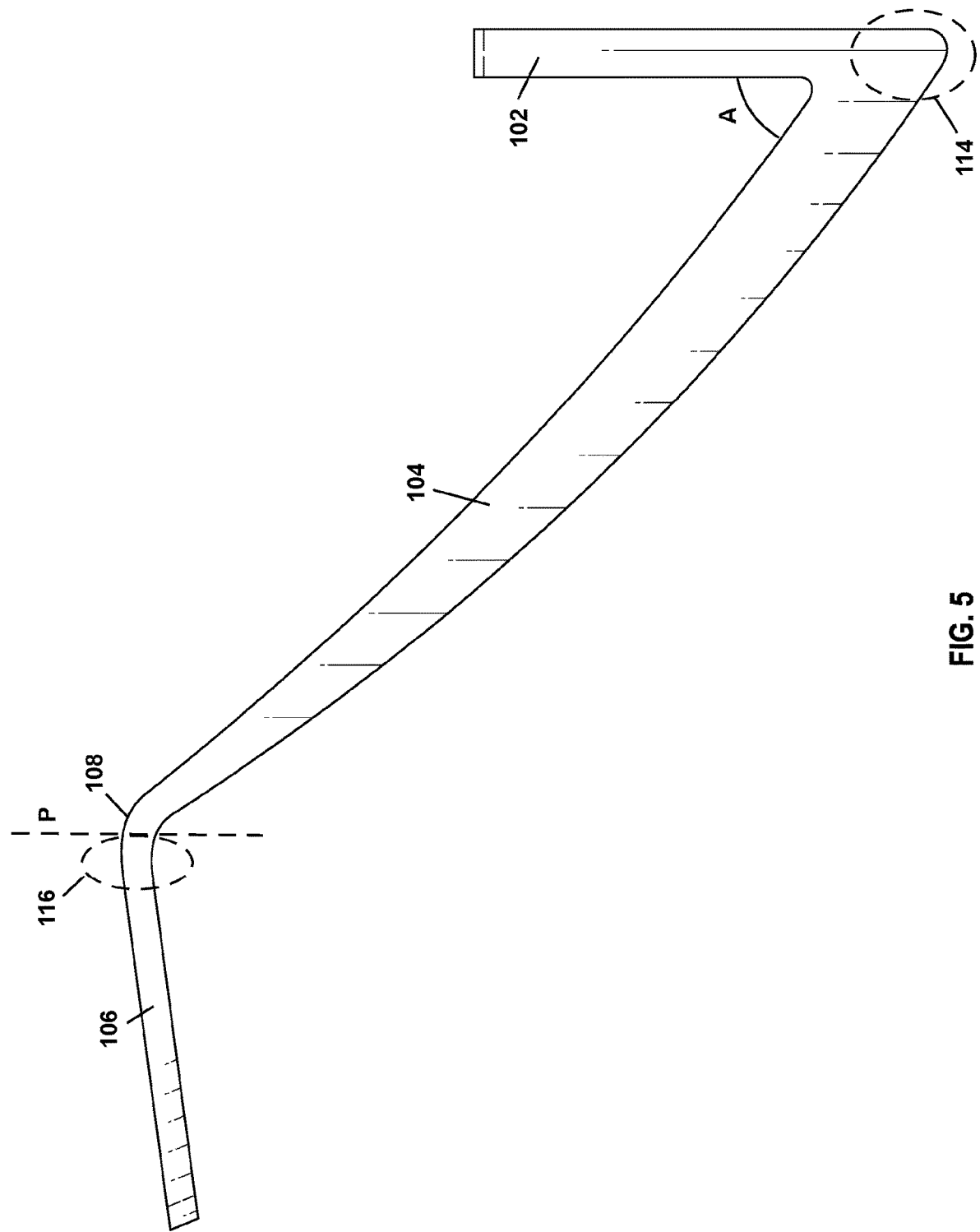
FIG. 5 is a right side plan view of a hat holder of FIGS. 1-4.
Figure 6:
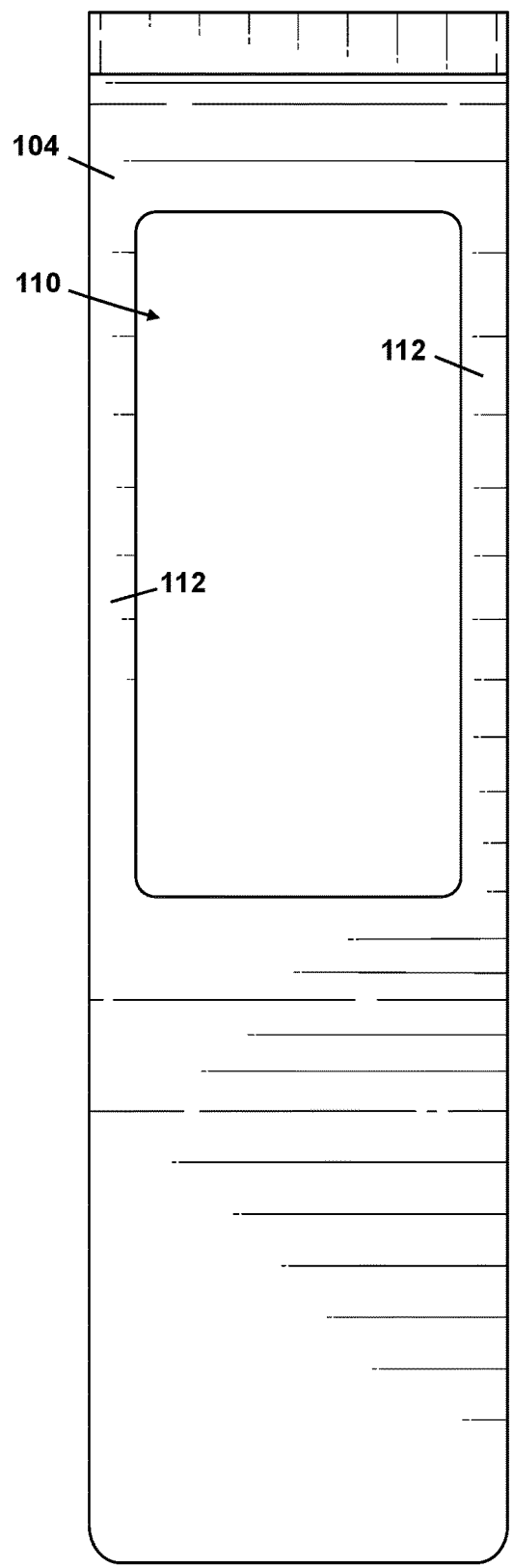
FIG. 6 is a top plan view of a hat holder of FIGS. 1-5.
Figure 7:
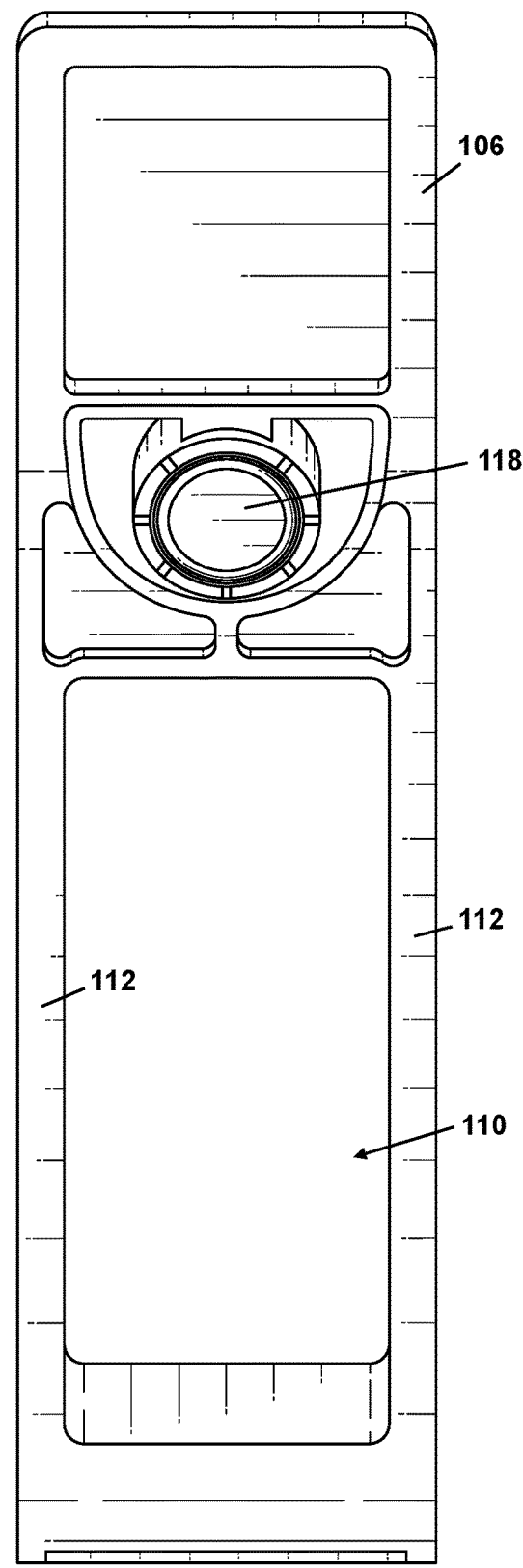
FIG. 7 is a bottom plan view of a hat holder of FIGS. 1-6.

In general, the terms and phrases used herein have their art-recognized meaning, which can be found by reference to standard texts, journal references and contexts known to those skilled in the art. The following definitions are provided to clarify their specific use in the context of this description.

"Proximal" and "distal" refer to the relative positions of two or more objects, planes or surfaces. For example, an object that is close in space to a reference point relative to the position of another object is considered proximal to the reference point, whereas an object that is further away in space from a reference point relative to the position of another object is considered distal to the reference point.

The terms "direct and indirect" describe the actions or physical positions of one component relative to another component. For example, a component that "directly" acts upon or touches another component does so without intervention from an intermediary. Contrarily, a component that "indirectly" acts upon or touches another component does so through an intermediary (e.g., a third component).

FIGS. 1-7 show a first embodiment of a hat holder 100 comprising a base 102 configured for substantially flush attachment to a mounting surface (such as a vertical wall or other vertical surface) and an arm 104 connected to base 102 and extending away from the mounting surface. Arm 104 joins a brim-support 106 to form a crest 108. As shown, widths (W) of base 102, arm 104, and brim-support 106 are the same, and arm 104 extends away from the mounting surface forming an acute angle (A) with a body (B) of base 102. Arm 104, as shown, also comprises a slot 110 such that arm 104 contains two longitudinal structural supports 112. Further, arm 104 is connected to an end 114 of base 102 and an end 116 of brim-support 106.

In an embodiment, a magnet 118 is disposed within hat holder 100. For example, magnet 118 may be intersected by a plane (P) through and parallel with crest 108. In an embodiment, magnet 118 may be bisected by the plane (P) through crest 108. As shown, magnet 118 is disposed in an underside of hat holder 100. Magnet 118 is positioned to attract a magnetic button of a ball cap when the hat is positioned over the hat holder. The attraction between magnet 118 and the magnetic button holds the hat is an "as-worn" orientation and does not allow the weight of the brim to pull the hat downward.

In an embodiment, base 102 may be screwed into a mounting surface. In an embodiment, a bottom surface 116 of base 102 is configured to mate with a wall cleat (not shown), for example, by slidably mating with the wall cleat.

Figure 8:
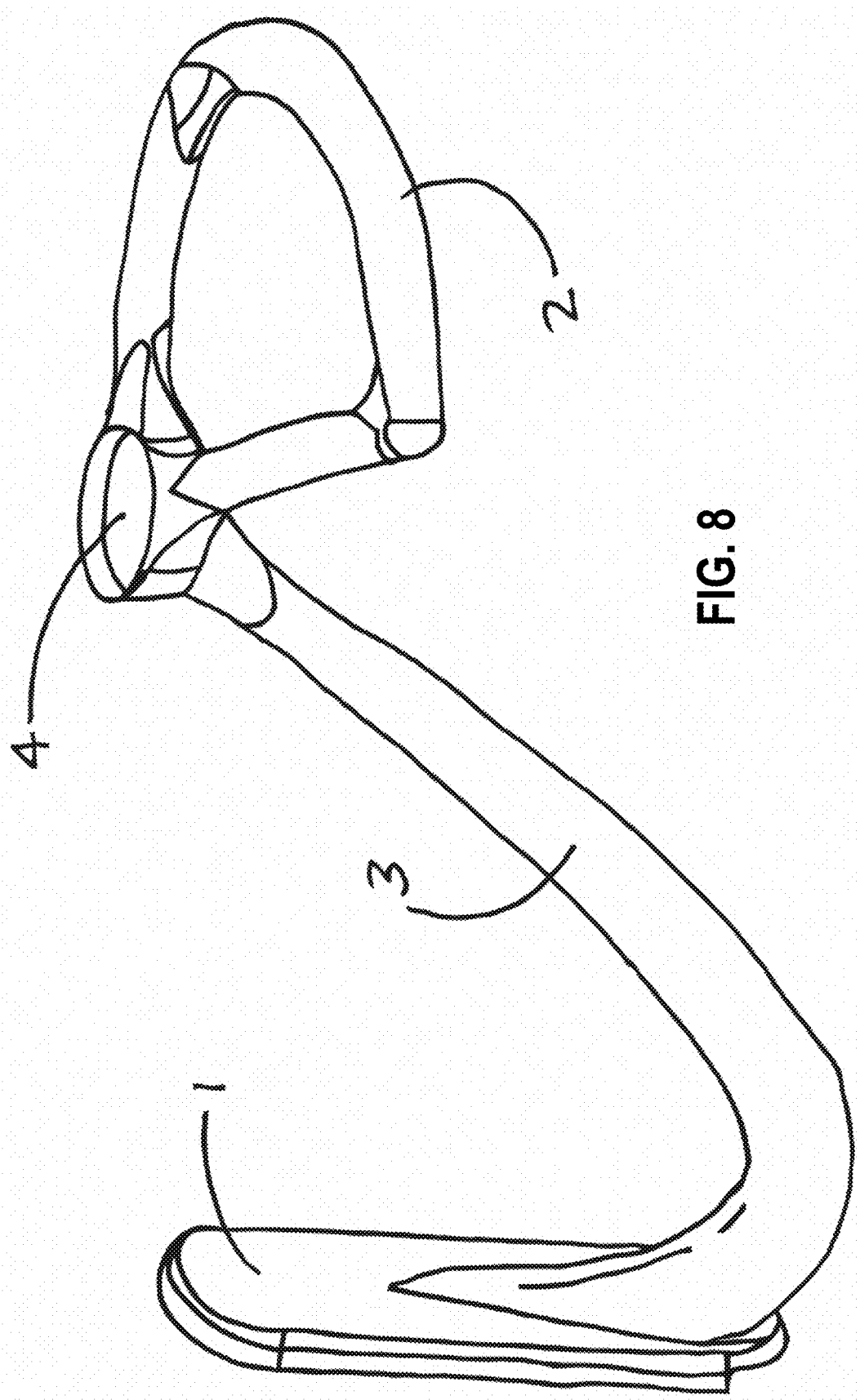
FIG. 8 depicts an isometric perspective view of a hat holder, according to an embodiment.

FIG. 8 depicts an isometric perspective view of another embodiment of a hat holder comprising a base 1 configured for substantially flush attachment to a mounting surface (such as a vertical wall or other vertical surface) and an arm 3 connected to base 1 and extending away from the mounting surface. Arm 3 joins a brim-support 2 to form a crest. Arm extends away from the mounting surface forming an acute angle (A) with a body (B) of base 1. Brim-support 2, as shown, comprises an opening such that brim-support 2 forms a ring. In addition, a magnet is disposed in a topside of the hat holder a crest formed by brim-support 2 and arm 3.

Figure 9:
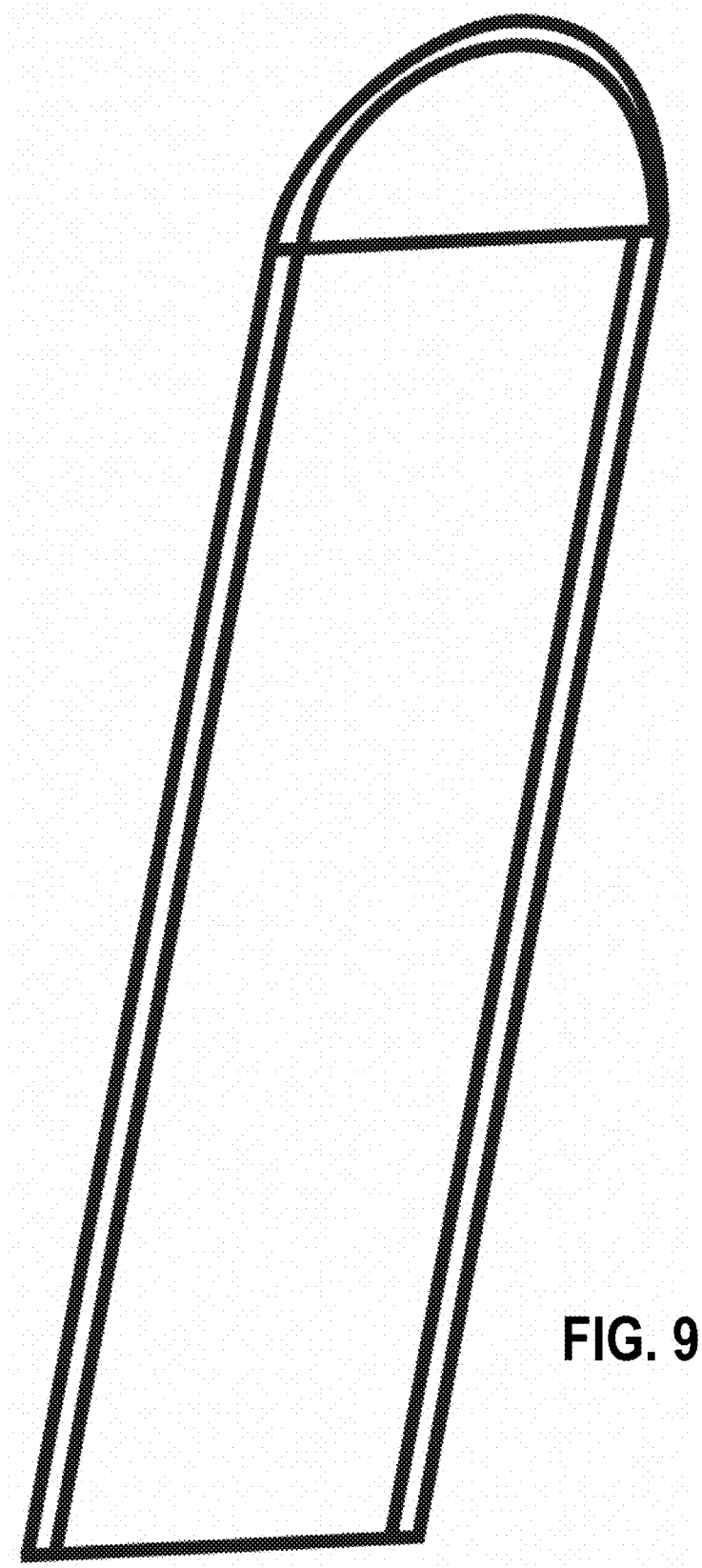
FIG. 9 depicts an isometric perspective view of a mounting feature of a base, according to an embodiment.

FIG. 9 depicts an isometric perspective view of a mounting feature of a base, according to an embodiment. This mounting feature may be disposed on a bottom surface of a base (102, 1) to slidably mate with a wall cleat that is affixed to a vertical mounting surface, for example, by an adhesive or fastener(s).

Use of the disclosed hat holders maintains the shape of a hat (e.g., ball cap) without leaving any marks on the hat.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in theft entireties, as though individually incorporated by reference.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and devices useful for the present methods and devices can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a hat" includes a plurality of such tabs and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described. Nothing herein is to be construed as an admission that the invention is not entitled to antedate such disclosure by virtue of prior invention.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements or limitation or limitations which is/are not specifically disclosed herein.

All art-known functional equivalents of materials and methods are intended to be included in this disclosure. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed can be resorted to by those skilled in the art, and that such modifications and variations are considered to be within the scope of this invention as defined by the appended claims.

What is claimed is:

1. A hat holder comprising:
   a base configured for attachment to a mounting surface;
   an arm connected to the base and extending at an upward angle and away from the mounting surface, wherein the arm joins a brim-support to form a crest, wherein the brim-support extends at a downward angle from the crest; and
   a magnet intersected by a plane through and parallel with the crest.

2. The hat holder of claim 1, wherein widths of the base, the arm, and the brim-support are the same.

3. The hat holder of claim 1, wherein the magnet is bisected by the plane through the crest.

4. The hat holder of claim 1, wherein the magnet is disposed within an underside of the hat holder.

5. The hat holder of claim 1, wherein the magnet is disposed within a topside of the hat holder.

6. The hat holder of claim 1, wherein the arm is connected to both an end of the base and an end of the brim-support.

7. The hat holder of claim 1, wherein a bottom surface of the base is configured to mate with a wall cleat.

8. The hat holder of claim 7, wherein the bottom surface of the base slidably mates with the wall cleat.

9. The hat holder of claim 1, wherein the arm comprises a slot.

10. The hat holder of claim 1, wherein the brim-support comprises an opening.

11. The hat holder of claim 1, wherein the mounting surface is a vertically oriented mounting surface.

12. A hat holder comprising:
    a base configured for attachment to a mounting surface; and
    an arm connected to the base and extending away from the mounting surface at an upward angle, wherein the arm joins a brim-support to form a crest, wherein the brim-support is angled at a downward angle from the crest;
    wherein widths of the base, the arm, and the brim-support are the same.

13. The hat holder of claim 12, wherein the arm is connected to both an end of the base and an end of the brim-support.

14. The hat holder of claim 12, further comprising a magnet intersected by a plane through and parallel with the crest.

15. The hat holder of claim 14, wherein the magnet is bisected by the plane through the crest.

16. The hat holder of claim 14, wherein the magnet is disposed within an underside of the hat holder.

17. The hat holder of claim 14, wherein the magnet is disposed within a topside of the hat holder.

18. The hat holder of claim 12, wherein the arm comprises a slot.

* * * * *